US012695955B2

(12) United States Patent
Jeong et al.

(10) Patent No.: US 12,695,955 B2
(45) **Date of Patent: \*Jul. 28, 2026**

(54) COMMENT MANAGEMENT METHOD AND SYSTEM FOR DISPLAYING COMMENTS

(71) Applicant: NAVER WEBTOON LTD., Seongnam-si (KR)

(72) Inventors: Jae-Seon Jeong, Seongnam-si (KR); Hyekyung Kim, Seongnam-si (KR); Hyeryeong Kim, Seongnam-si (KR); Kyuho Lee, Seongnam-si (KR); Byeonghoon Han, Seongnam-si (KR); Hyeong Gyu Kim, Seongnam-si (KR); Soo Han Jang, Seongnam-si (KR); Sunguk Chung, Seongnam-si (KR); Do Hoon Kim, Seongnam-si (KR); Seung Beom Han, Seongnam-si (KR); Da Hyeon Park, Seongnam-si (KR); Yun Ju Eom, Seongnam-si (KR); Ji Won Kim, Seongnam-si (KR); Seungwook Oh, Seongnam-si (KR); Seung Taek Lim, Seongnam-si (KR); Kain Choi, Seongnam-si (KR); Sun Ah Park, Seongnam-si (KR)

(73) Assignee: NAVER WEBTOON LTD., Seongnam-si (KR)

( * ) Notice: Subject to any disclaimer, the term of this patent is extended or adjusted under 35 U.S.C. 154(b) by 114 days.

This patent is subject to a terminal disclaimer.

(21) Appl. No.: 18/756,994

(22) Filed: Jun. 27, 2024

(65) Prior Publication Data

US 2024/0348890 A1 Oct. 17, 2024

Related U.S. Application Data

(63) Continuation of application No. 18/051,211, filed on Oct. 31, 2022, now Pat. No. 12,052,477.

(30) Foreign Application Priority Data

Jan. 10, 2022 (KR) ........................ 10-2022-0003370

(51) Int. Cl.
| | |
|---|---|
| *H04N 21/488* | (2011.01) |
| *H04L 51/21* | (2022.01) |
| *H04L 51/52* | (2022.01) |
| *H04N 21/472* | (2011.01) |
| *H04N 21/4788* | (2011.01) |

(52) U.S. Cl.
CPC ......... *H04N 21/4882* (2013.01); *H04L 51/21* (2022.05); *H04L 51/52* (2022.05); *H04N 21/47202* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 9,876,741 B1 | 1/2018 | Taboriskiy et al. | |
| 12,052,477 B2 * | 7/2024 | Jeong ..................... | H04L 51/21 |

(Continued)

FOREIGN PATENT DOCUMENTS

| | | |
|---|---|---|
| JP | 2013088832 A | 5/2013 |
| KR | 1020110125905 A | 11/2011 |

OTHER PUBLICATIONS

Office Action issued in corresponding Japanese patent application No. 2022-097274, dated May 23, 2023.

(Continued)

*Primary Examiner* — Boris D Grijalva Lobos
(74) *Attorney, Agent, or Firm* — Greer Burns & Crain Ltd.

(57) ABSTRACT
A comment management method manages a plurality of comments written about content and selects at least one first comment from among the plurality of comments based on a first condition that is based on feedback from users for each (Continued)

of the plurality of comments, selects a second comment based on the feedback and a second condition that is based on the time at which a comment is written, and distinguishably displays the first comment and the second comment on a user terminal that displays the content.

18 Claims, 8 Drawing Sheets

(56) References Cited

U.S. PATENT DOCUMENTS

| | | |
|---|---|---|
| 2012/0166453 A1 | 6/2012 | Broder |
| 2014/0289386 A1 | 9/2014 | Vatto et al. |
| 2015/0234887 A1 | 8/2015 | Greene |
| 2019/0028362 A1 | 1/2019 | Kim et al. |
| 2019/0200078 A1 | 6/2019 | Bhattacharya |
| 2023/0224547 A1 | 7/2023 | Park et al. |
| 2023/0319364 A1 | 10/2023 | Park |

OTHER PUBLICATIONS

Noncomment et al., "What is the best way to sort Top Best New", Reddit (2013).
Algernon, Asimov et al., "Order of Posts", Reddit (2017).
Notice of Reasons for Refusal—Japanese Patent Application 2022-09727 4 (2017).

* cited by examiner

Start

Select first comment(s) from among plurality of comments based on first condition — 310

Rank first comment — 315

Select second comment(s) from among plurality of comments based on second condition — 320

Rank second comment — 325

Distinguishably display first comment and second comment on user terminal — 330

End

From 320 or 325

From 330

COMMENT MANAGEMENT METHOD AND SYSTEM FOR DISPLAYING COMMENTS

CROSS-REFERENCE TO RELATED APPLICATION(S)

This is a Continuation of U.S. application Ser. No. 18/051,211, filed Oct. 31, 2022, which claims the benefit of priority under 35 U.S.C. § 119 to Korean Patent Application No. 10-2022-0003370 filed on Jan. 10, 2022, in the Korean Intellectual Property Office (KIPO).

BACKGROUND OF THE INVENTION

Field of Invention

One or more example embodiments of the following description relate to technology for managing comments written for content and, more particularly, to a comment management method and apparatus that may display a comment selected based on freshness of comment to be distinguished from other comments.

Description of Related Art

With the expanding spread of the Internet, users of various ages from children to the elderly may freely express their thoughts or opinions using the Internet.

For content (e.g., a news article, a post on an app, multimedia content, a video, a webtoon, other specific items to be evaluated, such as movies or restaurants, etc.), a user may express his or her own opinion or feedback through a comment.

Comments written by users often affect perception or judgement of other users. In particular, a comment that has received most recommendations or sympathies (i.e., the best comment) from among comments written for corresponding content has great influence on the perception or the judgement of users on the content.

Since the best comment is determined based on the number of recommendations count or the number of sympathies received from other users, a relatively earlier written comment is highly likely to be selected as the best comment. Therefore, the best comments selected for content are biased toward comments written earlier, and such biased best comments do not accurately reflect the real-time public opinion of the users for the content.

Meanwhile, Korean Patent Laid-Open Publication No. 10-2011-0125905, published on Nov. 22, 2011, refers to a comment management method using a pattern analysis and describes a method in which a comment management system analyzes comments requested to be registered in each of a plurality of webpages and sets a desired search pattern and manages comments based on the set search pattern.

The aforementioned information is merely provided to assist understanding and may include content that does not form a portion of the related art and may not include what the related art may present to those skilled in the art.

BRIEF SUMMARY OF THE INVENTION

One or more example embodiments may provide a comment management method that may select first comment(s) based on a first condition that is based on feedback from users for each of comments and select second comment(s) based on a second condition that is based on the feedback and a time at which a comment is written and may distinguishably display the first comment and the second comment on a user terminal.

One or more example embodiments may provide a comment management method that may also display best comments selected based on the number of preference indications or the number of non-preference indications from users, such as sympathy/indifference or recommendation/non-recommendation, and best comments selected by further considering freshness of comment as well as the number of preference indications or the number of non-preference indications.

According to an aspect of at least one example embodiment, there is provided a comment management method performed by a computer system configured to manage a plurality of comments written for content, the comment management method including selecting at least one first comment from among the plurality of comments based on a first condition that is based on feedback from users for each of the plurality of comments; selecting at least one second comment from among the plurality of comments based on a second condition that is based on a time at which a comment is written for the content and the feedback; and distinguishably displaying the first comment and the second comment on a user terminal that displays the content.

The feedback may include a preference indication or a non-preference indication from the users for each of the plurality of comments, the first condition may be a condition for selecting N first comments with a relatively higher preference of the users from among the plurality of comments, N denoting a natural number, and the second condition may be a condition for selecting K second comments with a relatively higher preference of the users from among latest comments written within a desired duration of time from the current point in time among the plurality of comments, K denoting a natural number.

Each of the selected first comment and second comment may satisfy at least one of a first requirement that a number of preference indications be greater than or equal to a first number and a second requirement that the number of preference indications be greater than or equal to a number of non-preference indications multiplied by the predetermined multiplier.

The first condition may include selecting, from among the plurality of comments, a comment of which a number of preference indications is greater than or equal to a first number and of which the number of preference indications is greater than or equal to a number of non-preference indications multiplied by a predetermined multiplier as the first comment, and The second condition may include selecting, from among the latest comments, a comment of which the number of preference indications is greater than or equal to the first number and of which the number of preference indications is greater than or equal to a number of non-preference indications multiplied by the predetermined multiplier as the second comment.

The current point in time may be a point at which the first comment and the second comment may be displayed on the user terminal that views the content, and the desired duration of time is 24 hours.

The selecting of the at least one first comment may include selecting a plurality of first comments, and the selecting of the second comment may include selecting a plurality of second comments, and the comment management method may further include ranking the first comments and ranking the second comments, and the distinguishably displaying of the first comment and the second comment may include distinguishably displaying the ranked first comments and the ranked second comments such that a higher-ranked comment is displayed above a lower-ranked comment.

The ranking of the first comments may include ranking the first comments in descending order of the number of preference indications received from the users for each of the first comments, and the ranking of the second comments may include ranking the second comments in descending order of the number of preference indications from the users for each of the second comments.

The ranking of the first comments may include ranking the first comments in descending order of a ratio of the number of preference indications to the number of non-preference indications from the users for each of the first comments, and the ranking of the second comments may include ranking the second comments in descending order of a ratio of the number of preference indications to the number of non-preference indications from the users for each of the second comments.

The distinguishably displaying of the first comment and the second comment may include displaying at least a portion of the first comments and the second comments in a first area of a screen of the user terminal; and displaying at least a portion of the plurality of comments or at least a portion of remaining comments excluding the first comments and the second comments from among the plurality of comments in a second area of the screen of the user terminal different form the first area.

The displaying of at least a portion of the first comments and the second comments in the first area may include displaying a highest-ranked second comment among the second comments at the top of the first area, displaying the first comments according to rankings below the highest-ranked second comment, and displaying remaining second comments excluding the highest-ranked second comment from among the second comments below the first comments.

The comment management method may further include monitoring whether the first condition or the second condition is met for each of the plurality of comments and reselecting at least one of the first comment and the second comment to be displayed in the first area from among the plurality of comments; and adjusting a display position of at least one of the first comment and the second comment in the first area based on the reselection.

The reselecting of at least one of the first comment and the second comment may include selecting, from among the plurality of comments, a comment that meets all of the first condition and the second condition as the first comment.

The reselecting of at least one of the first comment and the second comment may include, when a comment that meets all of the first condition and the second condition is the highest-ranked second comment among the second comments, selecting the comment that meets all of the first condition and the second condition as the second comment, and the highest-ranked second comment may be displayed at the top of the first area.

The selecting of the second comment may include, when a writing time of a comment preselected as the second comment is outside the desired duration of time from the current point in time, excluding the preselected comment from the second comment.

The comment management method may further include, when a comment preselected as the second comment meets the first condition, excluding the preselected comment from the second comment and selecting the same as the first comment.

The content may be webtoon content or one episode of the webtoon content, the content may convert from paid content, of which viewing by the user terminal is paid, to free content after a desired period of time elapses, and the plurality of comments may include at least one content written when the content is paid content and at least one content written when the content is free content.

The plurality of comments may include a comment written for a comment, and at least one of the first comment and the second comment may include the comment written for the comment.

According to an aspect of at least one example embodiment, there is provided a computer system including at least one processor configured to execute computer-readable instructions included in a memory. The at least one processor is configured to manage a plurality of comments written for content, select at least one first comment from among the plurality of comments based on a first condition that is based on feedback from users for each of the plurality of comments, select at least one second comment from among the plurality of comments based on a second condition that is based on a time at which a comment is written for the content and the feedback, and distinguishably display the first comment and the second comment on a user terminal that displays the content.

According to an aspect of at least one example embodiment, there is provided a user terminal including at least one processor configured to execute computer-readable instructions included in a memory. The at least one processor is configured to display a plurality of comments written for content through a screen of the user terminal, and distinguishably display a first comment selected from among the plurality of comments based on a first condition that is based on feedback from users for each of the plurality of comments and a second comment selected from among the plurality of comments based on a second condition that is based on a time at which a comment is written for the content and the feedback.

According to some example embodiments, when providing a best comment on content, it is possible to provide a best comment that accurately reflects a change in a public opinion over time for the content by displaying best comments selected based on the number of preference indications or the number of non-preference indications from users and best comments selected by further considering freshness of comment.

According to some example embodiments, it is possible to provide a best comment that accurately reflects public opinion of a recent point in time without being biased in favor of a comment written in a specific time period by selecting a best comment according to a condition based on a writing time of a comment as well as feedback from users and by excluding a comment other than a latest comment from among best comments selected over time.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals

Figure 1:
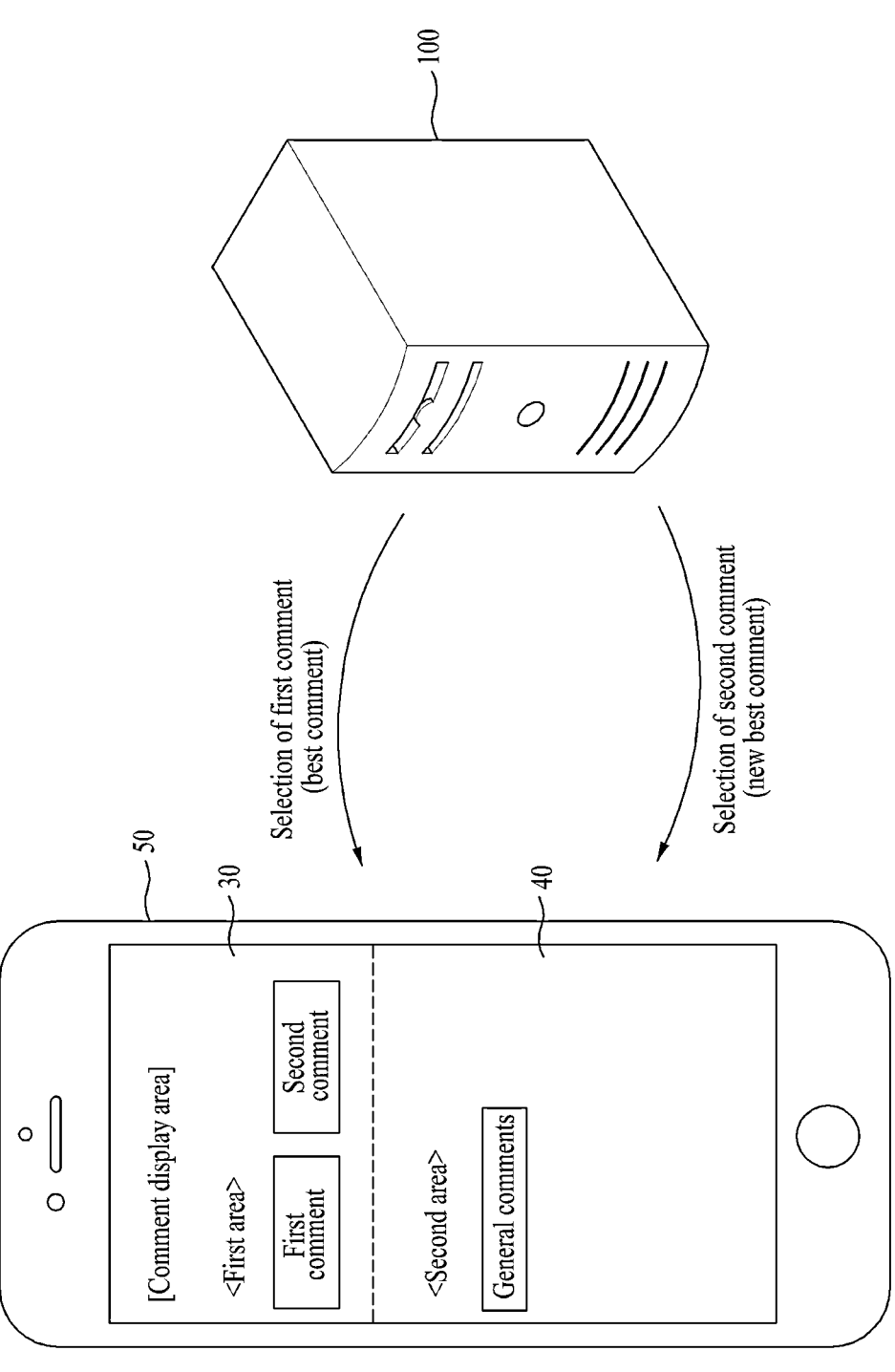
Figure 2:
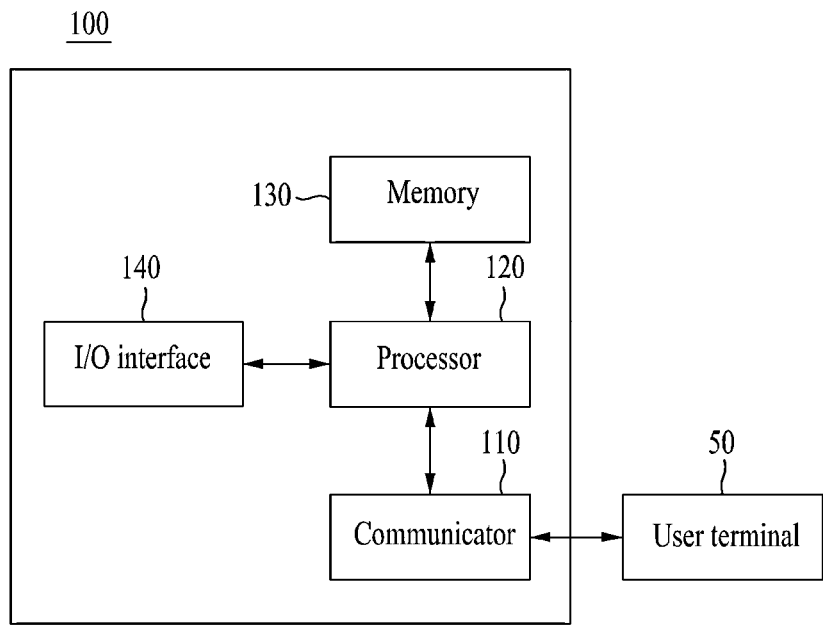
Figure 3:
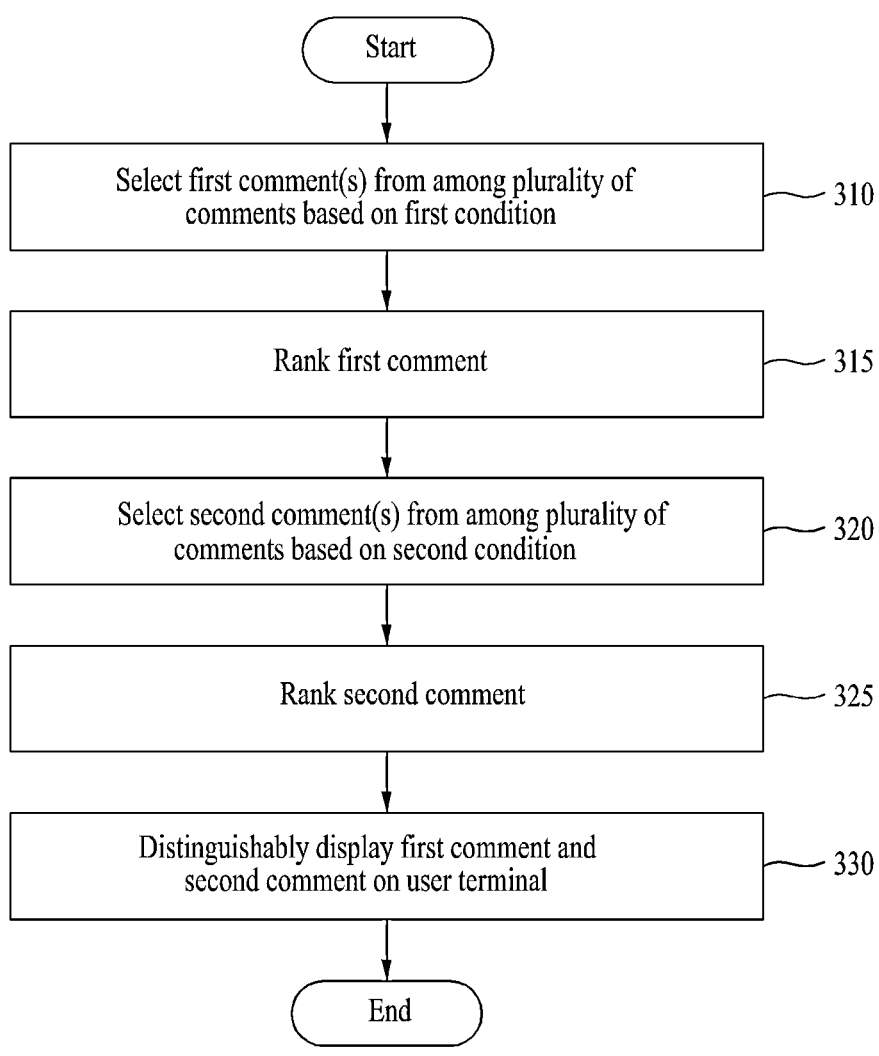
Figure 4:
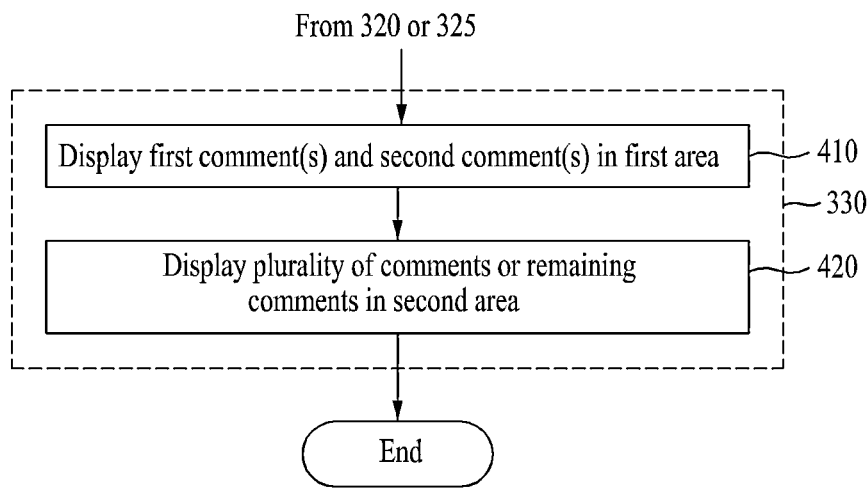
Figure 5:
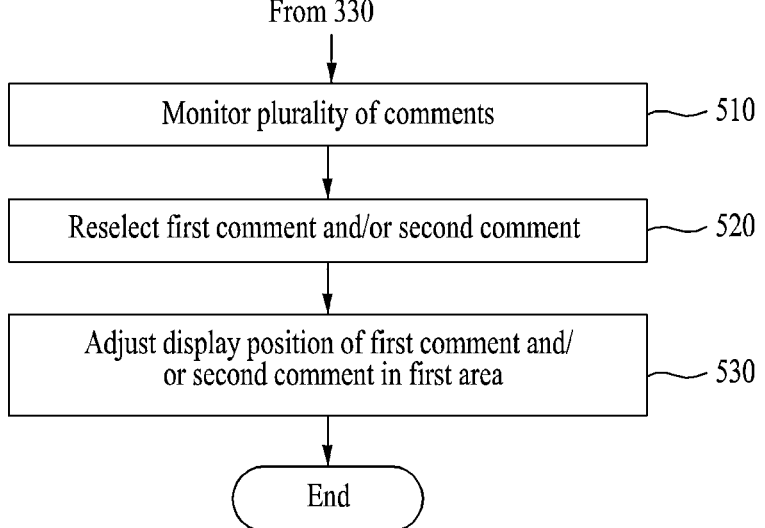
Figure 6:
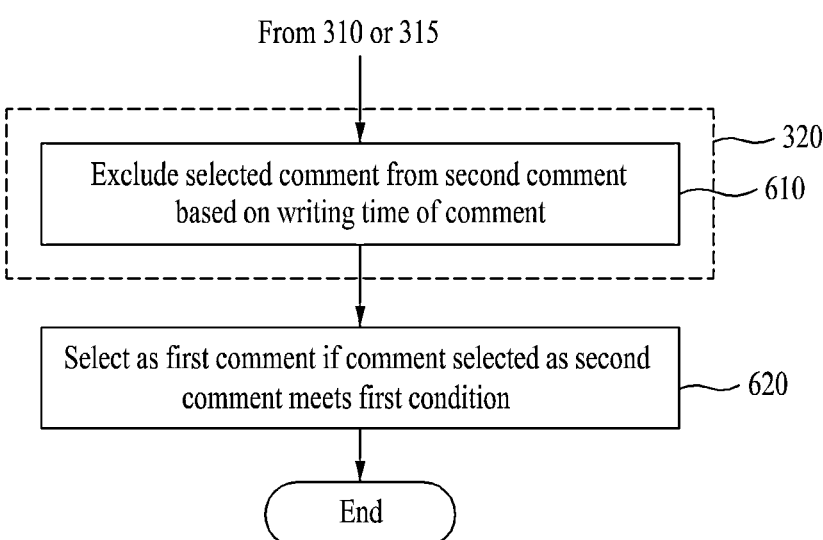
Figure 7:
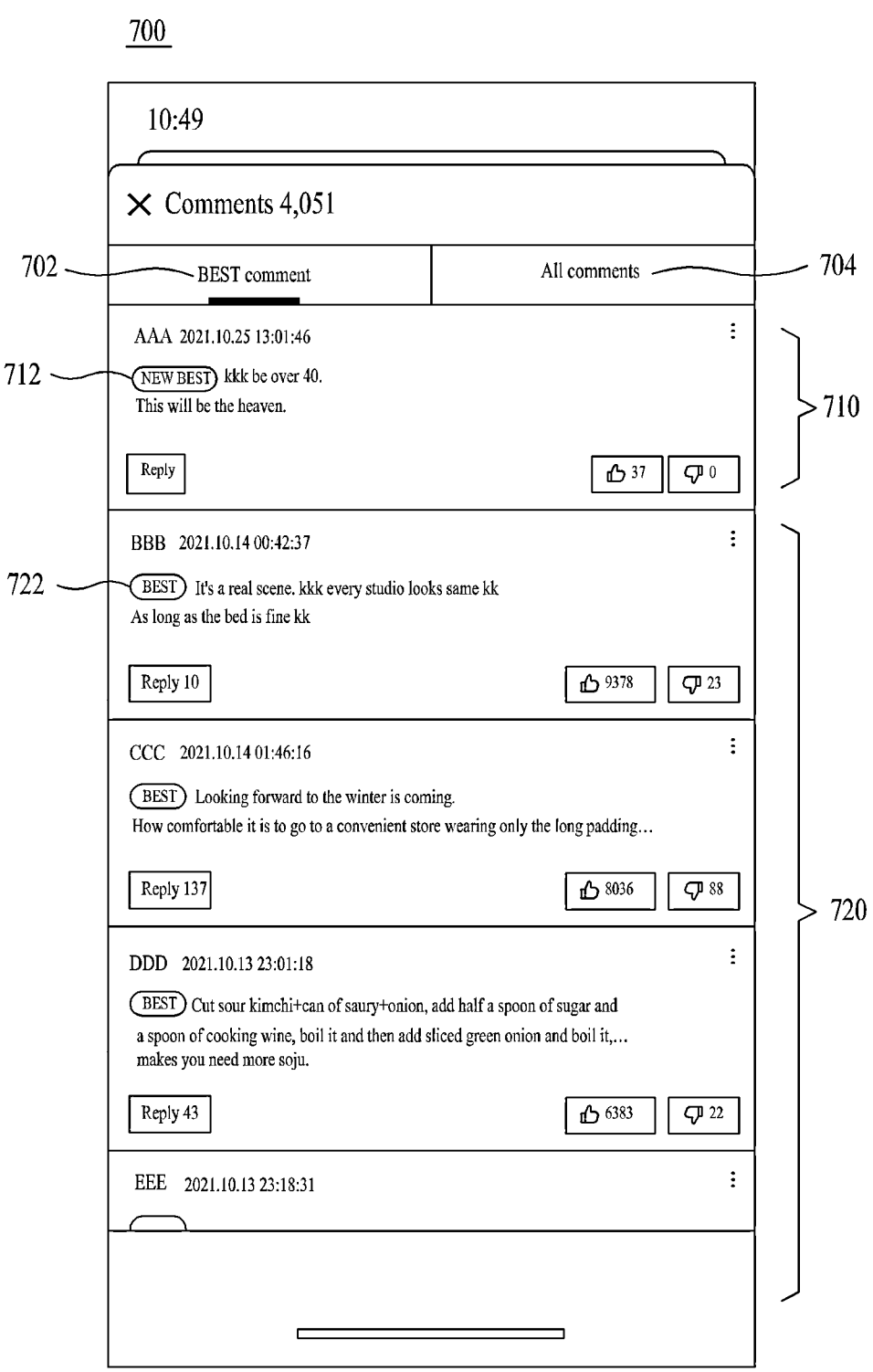
Figure 8:
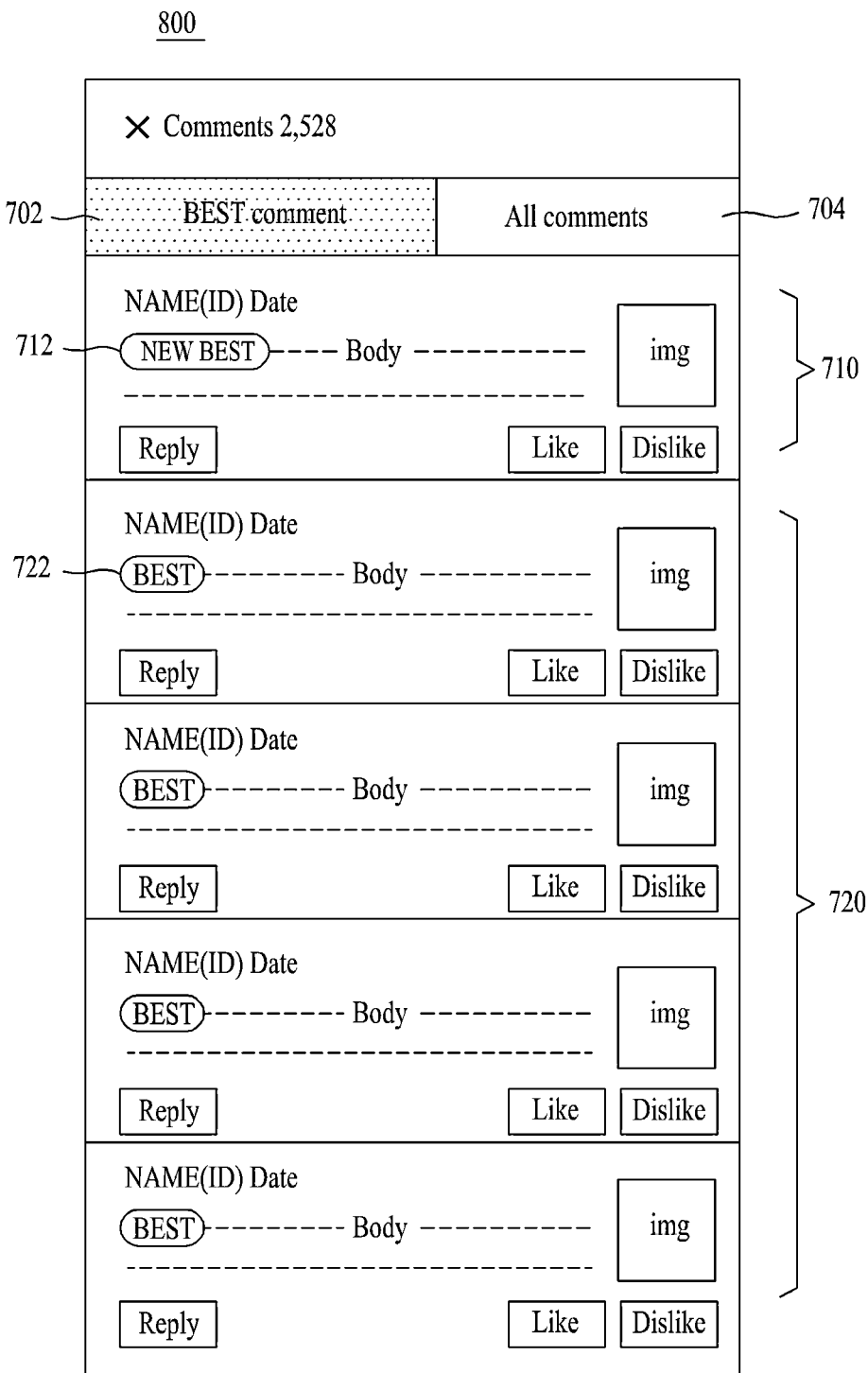
Figure 9:
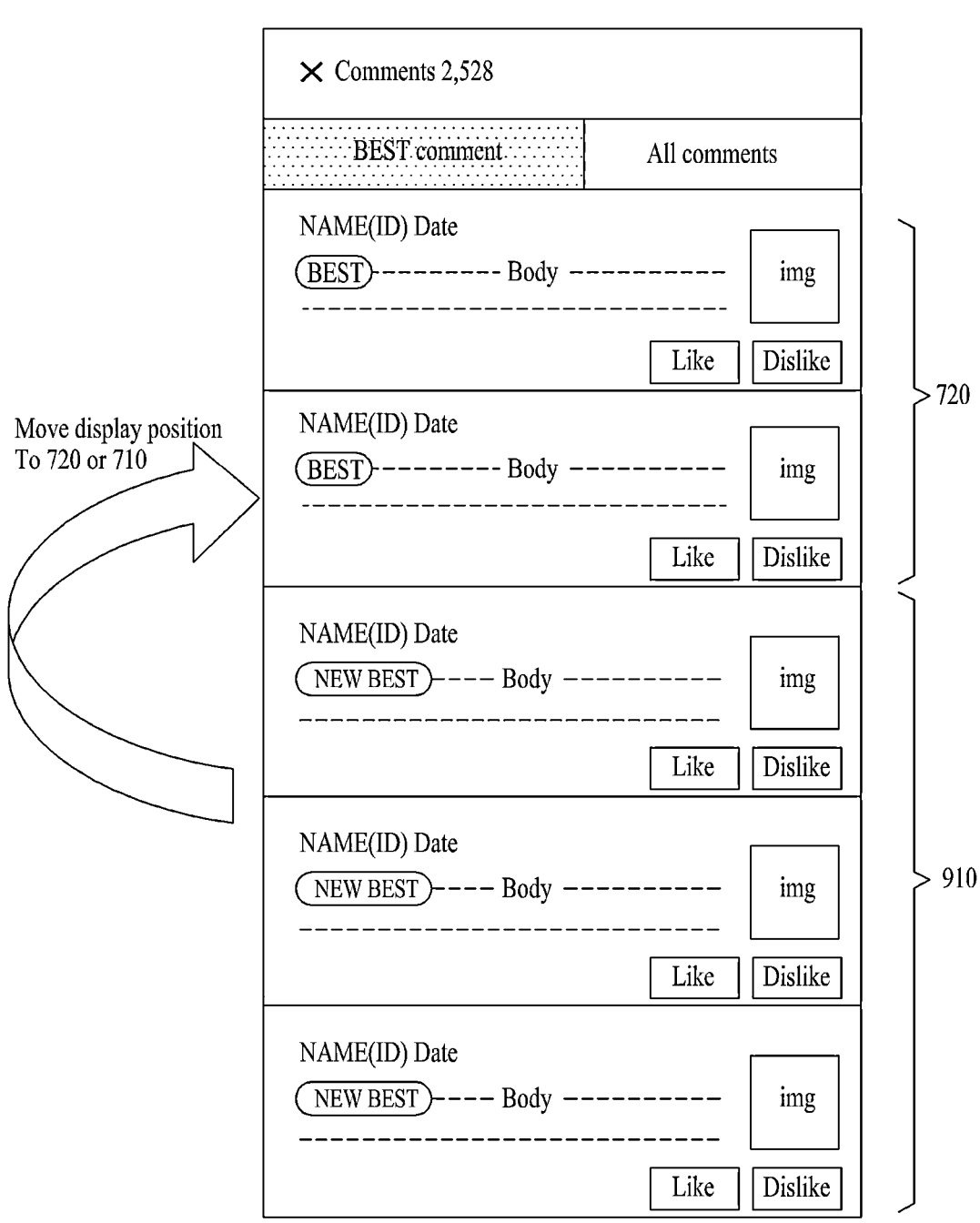

refer to like parts throughout the various figures unless otherwise specified, and wherein:

FIG. 1 illustrates an example of a comment management method distinguishably displaying a comment selected based on freshness of a comment and other comments according to at least one example embodiment;

FIG. 2 is a block diagram a computer system for performing a comment management method and a user terminal for displaying a comment according to at least one example embodiment;

FIG. 3 is a flowchart illustrating an example of a comment management method according to at least one example embodiment;

FIG. 4 is a flowchart illustrating an example of distinguishably displaying a first comment selected based on a first condition and a second comment selected based on a second condition, and a plurality of comments according to at least one example embodiment;

FIG. 5 is a flowchart illustrating an example of a method of monitoring comments written for content and adjusting a display position of a first comment and/or a second comment according to at least one example embodiment;

FIG. 6 is a flowchart illustrating an example of selecting or excluding a comment according to at least one example embodiment; and FIGS. 7 to 9 illustrate examples of ranking and displaying a first comment and a second comment on a screen of a user terminal according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates a comment management method that displays a comment selected based on freshness of a comment, i.e., a comment written within a predetermined time period, to be distinguished from other comments according to at least one example embodiment.

Hereinafter, a method of selecting a best comment (e.g., BePly or BeMment) from a plurality of comments and displaying the selected best comment on a user terminal 50 is described as a method of managing a plurality of comments performed by a computer system 100 with reference to FIG. 1. Each of the plurality of comments may be written by a user (e.g., a user of the user terminal 50) that views the content.

Content refers to an object that is subject to expressions of opinion or evaluation by a comment and may be, for example, a news article, a post on an app, multimedia content, a video, webtoon content, and other specific items to be evaluated, such as movies or restaurants. Each comment may include a text and/or an image input from a user.

Comments written for content may be managed by the computer system 100. The computer system 100 may be a server that manages registration, deletion, and change of a comment written for the content. Also, the computer system 100 may select at least one best comment based on a predetermined (or, alternatively, desired) criterion from among the plurality of comments written for the content and may display the selected best comment on the user terminal 50 of the user that views the content.

In an example embodiment, the computer system 100 may select the first comment(s) from among a plurality of comments written for the content based on a first condition that is based on feedback from users for each of the comments, and may select second comment(s) from among the plurality of comments based on a second condition that is based on the feedback and the time at which a corresponding comment is written. The selected first comment may be a best comment that is selected based on the number of preference indications and/or non-preference indications from the users for each comment. Also, the selected second comment may be a best comment selected by further considering freshness of each comment in addition to the number of preference indications and/or non-preference indication from the users for each comment.

The computer system 100 may display the selected first comment and second comment in a first area 30 within a comment display area of a screen of the user terminal 50. The first comment and the second comment may be distinguishably displayed in the first area 30. That is, the user terminal 50 may display the first comment and the second comment to be visually distinguished from each other.

The comment display area may be an area for displaying comments on content below (a lower end at which the content is scrolled) the content. Alternatively, the comment display area may be an area displayed on the screen when a specific link (e.g., a comment view link) is selected from the viewed content.

Meanwhile, the computer system 100 may display remaining comments (hereinafter, referred to as general comments), excluding the selected first comment and second comment from among the plurality of comments on the content, or the plurality of comments including the selected first comment and second comment, in a second area 40 within the comment display area of the screen of the user terminal 50. The general comments and the best comments (e.g., the first comment and the second comment) may be distinguishably displayed in the second area 40. That is, the user terminal 50 may display the general comments and the best comments (e.g., the first comment and the second comment) to be visually distinguished from each other.

As described above, in an example embodiment, the general comments and the best comments (e.g., the first comment and the second comment) may be distinguishably displayed using the first area 30 and the second area 40, and the first comment and the second comment may be distinguishably displayed in the first area 30 in which the best comments are to be displayed.

In the comment display area, the first area 30 may be an area displayed above the second area 40. Alternatively, each of the first area 30 and the second area 40 may be an area displayed in response to a selection on a button, a link, or a tab for displaying each corresponding area.

Therefore, according to an example embodiment, the first comment that is the best comment that reflects public opinions of users viewing content during the whole duration of time after the content is registered and the second comment that is the best comment that reflects public opinions of users in latest comments registered within a predetermined (or, alternatively, desired) duration of time from a current point in time may be distinguishably provided. In this manner, the best comments displayed in the first area 30 may more accurately reflect real-time opinions of users on the content.

A method of selecting the first comment and the second comment from among the plurality of comments on the content and a method of distinguishably displaying the first comment and the second comment are further described with reference to FIGS. 2 to 9.

FIG. 2 is a diagram illustrating an example of a computer system for performing a comment management method and a user terminal for displaying a comment according to an example embodiment.

The computer system 100 may be an apparatus that includes at least one computer, as an apparatus for managing a plurality of comments written for content. The computer system 100 may be a comment management server for the content.

The computer system 100 may select at least one best comment from among the plurality of comments written for the content. For example, the computer system 100 may select, from among the plurality of comments written for the content, first comment(s) based on a first condition that is based on feedback from users for each of the comments and may select second comment(s) based on a second condition that is based on the feedback and the time at which a corresponding comment is written.

Referring to FIG. 2, the computer system 100 may include a memory 130, a processor 120, a communicator 110, and an input/output (I/O) interface 140.

The memory 130 may be a permanent mass storage device, such as a random access memory (RAM), a read only memory (ROM), and a disk drive, as a non-transitory computer-readable record medium. Here, ROM and the permanent mass storage device may be included as a permanent storage device separate from the memory 130. Also, an OS and at least one program code may be stored in the memory 130. Such software components may be loaded from another non-transitory computer-readable record medium separate from the memory 130. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 130 through the communicator 110, instead of the non-transitory computer-readable record medium.

The processor 120 may be configured to process instructions of a computer program by performing basic arithmetic operations, logic operations, and I/O operations. The computer-readable instructions may be provided from the memory 130 or the communicator 110 to the processor 120. For example, the processor 120 may be configured to execute received instructions in response to the program code stored in the storage device, such as the memory 130. The processor 120 may be configured to perform/execute operations for performing a comment management method of example embodiments.

The communicator 110 may be a component for facilitating communication between the computer system 100 and another apparatus (e.g., a user terminal or another server). That is, the communicator 110 may be a hardware module, such as an antenna, a data bus, a network interface card, a network interface chip, and a network interface port of the computer system 100, or a software module, such as a network device driver or a networking program, configured to transmit/receive data and/or information with respect to another apparatus.

A communication scheme of the communicator 110 is not limited and may include a near field wired/wireless communication scheme between devices as well as a communication scheme using a communication network (e.g., a mobile communication network, wired Internet, wireless Internet, and a broadcasting network) includable in a network used by the computer system 100. For example, the network may include at least one of network topologies that include a personal area network (PAN), a local area network (LAN), a campus area network (CAN), a metropolitan area network (MAN), a wide area network (WAN), a broadband network (BBN), and the Internet. Also, the network may include at least one of network topologies that include a bus network, a star network, a ring network, a mesh network, a star-bus network, a tree or hierarchical network, and the like. However, they are provided as examples only.

The I/O interface 140 may be a device used for interfacing with an input device, such as a keyboard, a mouse, etc., and an output device, such as a display, a speaker, etc.

The processor 120 may manage components of the computer system 100, may manage the plurality of comments on the content, may select the first comment and the second comment from among the plurality of comments, may execute a program or an application for distinguishably displaying the first comment and the second comment on the user terminal 50, and may process an operation required for executing the program or the application and processing data. The processor 120 may be at least one processor (a CPU or a GPU) of the computer system 100 or may be at least one core in the processor.

Also, in some example embodiments, the computer system 100 and the processor 120 may include a greater or smaller number of components than the number of components shown in FIG. 2. The components included in the processor 120 may be a portion of the aforementioned processor 120 or a function implemented by the processor 120. That is, the components included in the processor 120 may be representations of different functions performed by the processor 120 in response to a control instruction according to a code of an OS or a code of at least one computer program.

A method of performing the comment management method of the example embodiment through the processor 120 of the computer system 100 is further described with reference to FIGS. 3 to 14.

The user terminal 50 refers to an electronic device and may be a smartphone that may install and execute an application or a program for displaying the content and comments written for the content and a device similar thereto. Also, the user terminal 50 may provide a user interface for writing a comment on content.

The user terminal 50 may be, for example, a personal computer (PC), a laptop computer, a tablet, an Internet of Things (IoT) device, and a wearable computer.

Although not illustrated, the user terminal 50 may include a memory, a processor, a communication interface, and an I/O interface as components, which is similar to the computer system 100. The description made above in relation to the components of the computer system 100 may apply alike to the memory, the processor, the communication, and the I/O interface of the user terminal 50 and thus, further description is omitted.

The I/O interface of the user terminal 50 may include a display as a component for displaying the content and the comments written for the content under the control of the processor. The display may be a component in which an input function and an output function are integrated into one, such as a touchscreen.

For example, the user terminal 50 of the example embodiment may be configured to include at least one processor configured to execute computer-readable instructions included in the memory. The processor may display the plurality of comments written for the content through a screen (i.e., the display) of the user terminal 50. Here, the processor may distinguishably display a first comment selected from among the plurality of comments based on a first condition that is based on feedback from users for each of the plurality of comments and a second comment selected from among the plurality of comments based on a second condition that is based on the feedback and the time at which a corresponding comment on the content is written. As described above, selection of the first comment and the second comment may be performed by the computer system 100.

Also, the computer system 100 and the user terminal 50 may include a greater or smaller number of components than the number of components shown in FIG. 2. However, there is no need to clearly illustrate many components known in the related art. For example, the user terminal 50 may be implemented to include at least a portion among I/O devices connected to the I/O interface 140 or may further include other components, such as a transceiver, a global positioning system (GPS) module, a camera, various types of sensors, and a database. In detail, for example, when the user terminal 50 is implemented in a form of a mobile device such as a smartphone, various components, such as a camera, an acceleration sensor or a gyro sensor, various physical buttons, a button using a touch panel, an I/O port, and a vibrator for vibration that are generally included in the mobile device may be further included in the user terminal 50.

Description related to technical features made above with reference to FIG. 1 may apply to FIG. 2 and thus, further description is omitted.

In the following, an operation performed by the computer system 100, or the processor 120 or the components thereof may be described as an operation performed by the computer system 100 for clarity of description. Likewise, an operation performed by the user terminal 50, or the processor thereof or the components of the processor may be described as an operation performed by the user terminal 50 for clarity of description.

FIG. 3 is a flowchart illustrating an example of a comment management method according to at least one example embodiment.

Hereinafter, the aforementioned method of selecting, by the computer system 100, the first comment and the second comment from among the plurality of comments written for or about another comment and distinguishably displaying the first comment and the second comment on the screen of the user terminal 50 is further described above with reference to FIG. 3.

The computer system 100 may manage the plurality of comments written for the content.

In operation 310, the computer system 100 may select at least one first comment from among the plurality of comments based on a first condition that is based on feedback from users for each of the plurality of comments. Here, the first condition may be a condition for selecting a best comment preset by the computer system 100 or an administrator of the computer system 100.

In operation 320, the computer system 100 may select at least one second comment from among the plurality of comments based on a second condition that is based on the time at which a comment is written for or about the content and the feedback from the users for each of the plurality of comments. Here, the second condition may be a condition for selecting a best comment that reflects the freshness requirement preset by the computer system 100 or the administrator of the computer system 100.

In operation 330, the computer system 100 may distinguishably display the first comment and the second comment on the user terminal 50 that displays the content. The user terminal 50 may display comments on the content when the content is viewed or may display comments on the content on the screen in response to a selection of a specific link (e.g., a comment view link) after the content is viewed. For example, as illustrated in FIG. 1, the first comment and the second comment may be displayed in the first area 30 of the comment display area. The first area 30 may be an area provided in an upper portion of the screen compared to the second area 40 for displaying all the comments on the content or remaining comments excluding the best comment.

The first comment and the second comment may be displayed to be visually distinguishable in the first area 30. Therefore, the user may intuitively identify the first comment and the second comment. For example, different indicators or icons may be added to the first comment and the second comment, respectively. For example, an indicator such as "BEST" may be added to the first comment and an indicator such as "NEW BEST" may be added to the second comment, such that both may be distinguishably displayed.

A method of distinguishably displaying the first comment and the second comment is further described with reference to FIGS. 4 to 9.

Hereinafter, the first condition and the second condition and a method of selecting the first comment and the second comment according to the first condition and the second condition are further described.

For example, feedback from the users for each of the comments that constitute the first condition and the second condition may include a preference indication or a non-preference indication from the users on each comment. Here, the preference indication may include an indication of recommendation, like, or sympathy. In contrast, the non-preference indication may indicate an indication of non-recommendation, dislike, or indifference.

The first condition may be a condition for selecting N first comments with a relatively higher preference of the users from among the plurality of comments based on the preference indication or the non-preference indication from the users for each comment. Here, N denotes a natural number as a preset number, for example, 15. Therefore, in operation

310, 15 best comments that meet the first condition may be selected from among the comments written for the content.

The second condition further considers the writing time of each comment and may be a condition for selecting a best comment (to which a freshness requirement is applied) from among latest comments written during a predetermined (or, alternatively, desired) duration of time from a current point in time among the plurality of comments written for the content. The second condition may be a condition for selecting K second comments with a relatively higher preference of the users from among the latest comments based on the preference indication or the non-preference indication among the latest comments. Here, K denotes a natural number as a preset number, for example, 15. Therefore, in operation 320, 15 best comments to which a freshness requirement is applied, meeting the second condition, may be selected from among the comments written for the content. Here, K and N may be set as different values.

As described above, in an example embodiment, by additionally selecting best comments (second comments) to which a freshness requirement is applied beyond simply selecting best comments (first comments) with a relatively higher preference from among the contents written for the content, it is possible to make the public opinion reflect such freshness, that is, up-to-dateness through the best comments on the content and to prevent the best comments from being biased in favor of comments written earlier.

Hereinafter, a method of selecting a comment with a relatively higher preference of the users from among the plurality of comments (or the latest comments) in relation to the first condition (or the second condition) is further described.

A comment having relatively high preference of users, that is, a higher-ranked comment among the plurality of comments may satisfy at least one of two requirements: i) that the number of preference indications be greater than or equal to a first number and ii) that the number of preference indications be greater than or equal to a number of non-preference indications multiplied by a predetermined multiplier (e.g., the predetermined multiplier=n). That is, each of the selected first comment and second comment may satisfy at least one of two requirements: i) that the number of preference indications be greater than or equal to the first number and ii) that the number of preference indications be greater than or equal to the number of non-preference indications multiplied by a predetermined multiplier. Each of the first number and the predetermined multiplier may be a value preset by the computer system 100 or by the administrator of the computer system 100. The first number may be, for example, 5 and the predetermined multiplier may be, for example, 10/3 (i.e., n=10/3). In other words, the number of preference indications may be greater than or equal to 10/3*the number of non-preference indications.

For example, the first comment and second comment may be comments that meet all the conditions of i) and ii). Here, the first condition may include selecting, from among the plurality of comments written for the content, a comment of which the number of preference indications is greater than or equal to the first number (e.g., 5) and the number of preference indications is greater than or equal to the number of non-preference indications multiplied by the predetermined multiplier (10/3) as the first comment. The second condition may include selecting, from among the latest comments on the content, a comment of which the number of preference indications is greater than or equal to the first number and of which the number of preference indications is greater than or equal to the number of non-preference indications multiplied by the predetermined multiplier as the second comment. The conditions of i) and ii) may be minimum conditions for selecting best comments corresponding to the first comment and the second comment, which may be represented as follows:

[Minimum Condition for Selecting Best Comment]

i) Number of preference indications>=first number (e.g., 5) and ii) number of preference indications>number of non-preference indications/0.3.

As described above, a comment with higher preference of users among comments may be determined by comprehensively considering the number of preference indications and the number of non-preference indications of the users on the comment.

The comment with the higher preference may be, for example, a comment of which the number of preference indications (i.e., the number of sympathies) ranks relatively high or of which number of preference indications/number of non-preference indications (i.e., a sympathy ratio) ranks relatively high among comments that meets the minimum condition for selecting the best comment. That is, the preference may be determined among the comments that meet the minimum condition for selecting the best comment as the number of sympathies or a sympathy ratio.

As described above, the method of selecting a comment with a relatively higher preference of users from among the plurality of comments in association with the first condition may also apply to a method of selecting a comment with a relatively higher preference of the users from among the plurality of latest comments in association with the second condition. Here, depending on example embodiments, a method of selecting a comment with a relatively higher preference of the users (e.g., a method of using a condition, a different number of preference indications and/or a condition of using a different number of preference indications/ number of non-preference indications) in association with the second condition different from the first condition may be used.

Hereinafter, a method of selecting the latest comments from among the plurality of comments written for content in selecting the second comment is further described.

Comments written during a predetermined (or, alternatively, desired) duration of time from a current point in time may be determined by considering the time at which each of a plurality of comments is written for the content. The predetermined (or, alternatively, desired) duration of time refers to a value preset by the administrator of the computer system 100, for example, 24 hours. That is, the second comment is selected from among comments written within 24 hours and the selected second comment may be a best comment to which the freshness requirement is applied.

The "current point in time" may refer to a point in time at which comments (i.e., comments that include the selected first comment and second comment) are displayed/referred to at the user terminal 50 that views the content. Alternatively, the "current point in time" may be a point in time at which the user terminal 50 views the content.

Therefore, depending on example embodiments, the best comment (the second comment) to which the freshness requirement is applied (i.e., written within 24 hours) based on a point in time at which the user terminal 50 views the content or displays/refers to comments on the screen may be provided to the user terminal 50. The second comment may be updated to apply the freshness requirement based on a point at which the user terminal 50 views the content or displays/refers to the comments on the screen. Therefore, the updated second comment may be provided to the user terminal 50.

Alternatively, depending on example embodiments, a predetermined (or, alternatively, desired) duration of time not from a current point in time but from a specific reference time (e.g., 0:00 o'clock to 0:00 o'clock the following day) may be used to select the latest comments for selecting the second comment. In this case, not a best comment to which a freshness requirement from the current point in time is applied but a best comment to which a freshness requirement corresponding to a specific date (i.e., the same day) is applied may be provided. In this regard, repeated description is omitted.

Hereinafter, a method of ranking first comments and second comments in a case in which a plurality of first comments is selected through operation 310 and a plurality of second comments is selected through operation 320 is further described.

In operation 310, the computer system 100 may select the plurality of first comments. In operation 315, the computer system 100 may rank the selected first comments. Ranking the first comments may refer to determining a ranking of each of the selected N first comments. Ranking the first comments may refer to ranking the first comments in descending order of the number of preference indications from the users for each of the first comments.

For example, the computer system 100 may select the plurality of first comments in descending order of the number of preference indications from among the plurality of comments written for the content and may rank the selected first comments. Alternatively, the computer system 100 may select higher-ranked N first comments from among comments that meet the aforementioned minimum condition for selecting a best comment among the plurality of comments written for the content, and may rank the selected N first comments.

In operation 320, the computer system 100 may select the plurality of second comments. In operation 325, the computer system 100 may rank the selected second comments. Ranking the second comments may refer to determining a ranking of each of the selected K second comments.

For example, the computer system 100 may select, from among the latest comments written for the content, the plurality of second comments in descending order of preference indications and may rank the selected second comments. Alternatively, the computer system 100 may select higher-ranked K second comments from among comments that meet the minimum condition for selecting the best comment among the latest comments written for the content, and may rank the selected K second comments.

When distinguishably displaying the first comments and the second comments, the computer system 100 may display the ranked first comments and the ranked second comments to be distinguished from each other and may display a higher-ranked comment above a lower-ranked comment. For example, in response to a selection on an option of "sort and view by net sympathy" for the comments on the content on the user terminal 50, the ranked first comments and the ranked second comments may be distinguishably displayed on the user terminal 50. Depending on example embodiments, when the option of "sort and view by net sympathy" is selected, the aforementioned "minimum condition for selecting the best comment" may not be considered. Here, the first comments and the second comments may be selected and ranked based on the number of preference indications alone without using the number of non-preference indications and then displayed on the user terminal 50.

As another method of ranking the selected first comments and second comments, a method of using a ratio of the number of preference indications to the number of non-preference indications is described below.

For example, when ranking the selected first comments, the computer system 100 may rank the first comments in descending order of a ratio of the number of preference indications to the number of non-preference indications from the users for each of the first comments. Also, when ranking the second comments, the computer system 100 may rank the second comments in descending order of a ratio of the number of preference indications to the number of non-preference indications from the users for each of the second comments. Therefore, the first comments and the second comments may be ranked in descending order of a sympathy (or a recommendation) ratio.

Even in this case, when distinguishably displaying the first comments and the second comments, the computer system 100 may display the ranked first comments and the ranked second comments to be distinguished from each other and may display a higher-ranked comment above a lower-ranked comment. For example, in response to a selection on an option of "sort and view by sympathy ratio" for the comments on the content on the user terminal 50, the ranked first comments and the ranked second comments may be distinguishably displayed on the user terminal 50.

A method of distinguishably displaying the first comment(s) and the second comment(s) is further described with reference to FIGS. 4 to 9.

Description related to technical features made above with reference to FIGS. 1 and 2 may apply to FIG. 3 and thus, further description is omitted.

FIG. 4 is a flowchart illustrating an example of distinguishably displaying a first comment selected based on a first condition and a second comment selected based on a second condition, and plurality of comments according to at least one example embodiment.

A method of distinguishably displaying the selected first comment(s) and the selected second comment(s) is further described with reference to FIG. 4.

In operation 410, the computer system 100 may display at least a portion of the first comments and the second comments in the first area 30 of the screen of the user terminal 50. For example, the computer system 100 may display, in the first area 30, at least a portion of, that is, a desired number of higher-ranked comments among the ranked first comments and the ranked second comments. When only some of the first comments and the second comments are displayed in the first area 30, the remaining first comments and second comments may be displayed on the screen in response to scrolling or a selection on "view more option" for the first area 30 by the user terminal 50.

In operation 420, the computer system 100 may display at least a portion of the plurality of comments written for the content or at least a portion of remaining comments excluding the first comments and the second comments from among the plurality of comments in the second area 40 of the screen of the user terminal 50 different from the first area 30. For example, the second area 40 may be an area provided below the first area 30 of the screen of the user terminal 50. Alternatively, the second area 40 may be an area displayed in response to a selection on a tab on the user terminal 50 different from that of the first area 30.

When only a portion of comments are displayed in the first area 30, the remaining comments may be displayed on the screen in response to scrolling or a selection on "view more option" for the second area 40 by the user terminal 50.

That is, as described above with reference to FIG. 1, since the first area 30 corresponding to a best comment area and the second area 40 corresponding to a general comment area are distinguished from each other, the best comments (the first comments and the second comments) and general comments (the remaining comments or all comments) may be distinguished from each other and thereby displayed on the user terminal 50.

Also, as described above with reference to operation 330, the selected first comment(s) and the selected second comment(s) may be distinguishably displayed.

For example, different indicators or icons may be added to the first comments and the second comments, respectively. For example, an indicator such as "BEST" may be added to each of the first comments and an indicator such as "NEW BEST" may be added to each of the second comment, such that both may be distinguishably displayed. The second comment may be identified as a best comment to which freshness is applied by an indication of "NEW."

Also, when displaying the first comments and the second comments in the first area 30, the computer system 100 may display the highest-ranked second comment among the second comments at the top of the first area 30. That is, the highest-ranked second comment may be displayed at the top of the first area 30 of the screen of the user terminal 50.

Also, the computer system 100 may display the first comments according to rankings below the highest-ranked second comment. That is, the computer system 100 may display the first comments according to rankings from below the highest-ranked second comment displayed in the first area 30 of the screen of the user terminal 50.

Also, the computer system 100 may display the remaining second comments excluding the highest-ranked second comment from among the second comments according to rankings below the first comments. That is, the computer system 100 may display the second comments starting from a second-ranked second comment from below an area in which the first comments are displayed in the first area 30 of the screen of the user terminal 50.

FIG. 7 illustrates an example of a method of ranking and displaying a first comment and a second comment on a screen of a user terminal according to at least one example embodiment.

Referring to FIG. 7, a screen 700 of the user terminal 50 may correspond to the aforementioned first area 30 and may be a best comment area for displaying first comments and second comments. In the illustrated example, the best comment area may refer to an area in which a tab 702 is selected and displayed. When a tab 704 is selected, the aforementioned general comment area (i.e., the second area 40) may be displayed on the screen 700.

Referring to FIG. 7, an indication or an indicator 712 of "NEW BEST" may be added to each of the second comments and an indication or an indicator 722 of "BEST" may be added to each of the first comments. Therefore, a user that views a comment may intuitively know whether a corresponding best comment is a best comment to which freshness is applied.

Also, the highest-ranked second comment among the second comments may be displayed in an uppermost area 710 of the best comment area. The second comment displayed in the uppermost area 710 may be a comment with the highest preference of users among best comments to which freshness is applied (i.e., a comment having a largest number of sympathies or a highest sympathy ratio among latest comments written within 24 hours based on a display point in time).

First comments may be displayed sequentially (i.e., in order of ranking) in an area 720 below the uppermost area 710. Second comments may be displayed according to rankings in an area below the area 720 in which the first comments are displayed according to rankings. That is, the remaining second comments excluding the second comment displayed in the uppermost area 710 may be displayed according to rankings below the first comments.

In the example of FIG. 7, best comments corresponding to the first comments and the second comments may be sorted by "number of sympathies (by net sympathy)." If an option of sorting the best comments corresponding to the first comments and the second comments by "sympathy ratio" is selected by the user terminal 50, display positions of the first comments and/or the second comments may be adjusted based on a sympathy ratio of each corresponding comment.

Also, there may be a comment written for a corresponding comment (i.e., a nested comment) for each comment. In an example embodiment, the "plurality of comments written for the content" may include such comment written for the corresponding comment.

The computer system 100 may also select such a nested comment as the aforementioned first comment and/or second comment depending on whether the first condition and/or the second condition is met. Also, when the nested comment is selected as the first comment or the second comment, the computer system 100 may display the nested comment to be distinguished from the remaining best comments on the screen of the user terminal 50. For example, an indication (e.g., "nested comment") representing the nested comment may be further marked on a best comment corresponding to the nested comment, in addition to the aforementioned indication of "NEW BEST" or "BEST." Also, a user interface (e.g., a button or a link) for viewing a comment that is a basis of the corresponding nested comment may be further added to the best comment that is the nested comment.

Description related to technical features made above with reference to FIGS. 1 to 3 may also apply to FIGS. 4 to 7 and thus, further description is omitted.

FIG. 5 is a flowchart illustrating an example of a method of monitoring comments written for content and adjusting a display position of a first comment and/or a second comment according to at least one example embodiment.

In an example embodiment, the first comment and the second comment selected and displayed on the user terminal 50 may be updated according to the feedback from the users and over time.

In operation 510, the computer system 100 may monitor the plurality of comments on the content. For example, the computer system 100 may monitor feedback from the users on comments already written and registered and new comments written and registered, as time elapses. Therefore, the computer system 100 may monitor whether each comment meets the first condition or the second condition.

In operation 520, the computer system 100 may reselect a first comment and/or a second comment to be displayed in the first area 30 from among the plurality of comments by monitoring whether the first condition or the second condition is met for each of the plurality of comments written for the content.

In operation 530, the computer system 100 may adjust the display position of the first comment and/or the second comment in the first area 30 based on the reselection of operation 520.

That is, the computer system 100 may exclude, from the second comment, that is, selecting of the second comment, a comment that was selected as the second comment and no longer corresponds to a latest comment over time, may reselect, as the first comment or the second comment, a new comment corresponding to the first comment or the second comment according to a change in the number of preference indications and the number of non-preference indications, and may exclude, from selecting of the first comment or the second comment, a comment that no longer corresponds to the first comment or the second comment due to a change in the number of preference indications and the number of non-preference indications. The computer system 100 may adjust a display position of the first comment and/or the second comment in the first area 30 according to such a reselection and exclusion process.

Although the aforementioned operation 520 of resection is described separate from operations 310 and 320 of selecting the first comment and the second comment, operations 310 and 320 may be identical to operation 520 in that operations 310 and 320 are performed by monitoring, by the computer system 100, comments on the content.

In terms of selecting (or reselecting) the first comment or the second comment, the computer system 100 may select, from among the plurality of comments, a comment that meets all of the first condition and the second condition as the first comment. For example, when a certain comment corresponds to all of the second comment and the first comment, the computer system 100 may select the corresponding comment as the first comment.

Also, when the comment that meets all of the first condition and the second condition is the highest-ranked second comment among the second comments, the computer system 100 may select (or reselect) the comment that meets all of the first condition and the second condition as the second comment. Here, the computer system 100 may display the highest-ranked second comment at a top, that is, the uppermost area 710 of the first area 30.

For example, the comment that meets all of the first condition and the second condition may be selected as the first comment by monitoring whether the first condition and the second condition are met for each of the comments. Here, when the corresponding comment is the highest-ranked comment among comments that meets the second condition, the corresponding comment may be selected as the second comment and displayed in the uppermost area 710. That is, a comment is preferentially selected as a general best comment, but if the corresponding comment is the highest-ranked comment among best comments to which freshness is applied, the corresponding comment may be preferentially selected as the best comment to which freshness is applied.

FIG. 6 is a flowchart illustrating an example of selecting a comment as, or excluding a comment from, a first comment or a second comment as the comment meets a first condition and a second condition according to at least one example embodiment.

In operation 610, unless the writing time of a comment preselected as the second comment is within a predetermined (or, alternatively, desired) duration of time from the current point in time in selecting (or reselecting) the second comment, the computer system 100 may exclude the preselected comment from the selecting of the second comment.

When the preselected second comment is no longer the latest comment after the writing time of the preselected second comment elapses, for example, 24 hours from the current point in time, the computer system 100 may exclude the corresponding second comment from the selecting of the second comment and may not be displayed in the first area 30.

In operation 620, when the comment preselected as the second comment meets the first condition, the computer system 100 may exclude the corresponding preselected comment from selecting of the second comment and may select the same as the first comment. For example, when the comment additionally meets the first condition according to feedback from a user on the preselected second comment and is selectable even as the first comment accordingly, the second comment may also be selected as the first comment. Here, the second comment selected as the first comment may be excluded from selecting of the second comment. Therefore, the corresponding comment may be displayed in the area 720 in which the first comment is displayed without being displayed in an area in which the second comment of the first area 30 is displayed.

Here, when a comment corresponding to the second comment or a comment corresponding to the first comment is the highest-ranked comment among the second comments according to feedback from a user, the corresponding comment may be displayed in the uppermost area 710 of the first area 30 as the second comment. That is, although a comment is preferentially selected as a general best comment (the first comment), the corresponding comment may be the highest-ranked comment among best comments (the second comments) to which freshness is applied, the corresponding comment may be preferentially selected as a best comment to which freshness is applied.

Therefore, as described above, in response to an elapse of time according to a writing time of a corresponding comment and feedback from users, the display position of the comment may be adjusted between the first area 30 and the second area 40 or within the first area 30.

Description related to technical features made above with reference to FIGS. 1 to 4 and FIG. 7 may apply to FIGS. 5 and 6 and thus, further description is omitted.

FIGS. 8 and 9 illustrate examples of ranking and displaying a first comment and a second comment on a screen of a user terminal according to at least one example embodiment.

Referring to FIGS. 8 and 9, a method of displaying a first comment and a second comment on a screen 800, 900 of the user terminal 50 and adjusting a display position thereof over time is further described with reference to FIGS. 8 and 9.

The screen 800, 900 may correspond to the first area 30 and may be a best comment area in which first comments and second comments are displayed. In the illustrated example, the best comment area may be displayed in response to a selection on the tab 702. Also, in response to a selection on the tab 704, the aforementioned general comment area (i.e., the second area 40) may be displayed on the screen 700. Referring to FIGS. 8 and 9, the indication or the indicator 712 of "NEW BEST" may be added to each of the second comments and the indication or the indicator 722 of "BEST" may be added to each of the first comments. Therefore, a user that views a comment may intuitively know whether a corresponding best comment is a best comment to which freshness is applied.

Also, a highest-ranked second comment among the second comments may be displayed in the uppermost area 710 of the best comment area. The second comment displayed in the uppermost area 710 may be a comment corresponding to highest preference of users among best comments to which freshness is applied.

The first comments may be displayed according to rankings in the area 720 below the uppermost area 710. Second comments may be displayed according to rankings in an area 910 below the area 720 in which the first comments are displayed according to rankings. That is, the remaining second comments excluding the second comment displayed in the uppermost area 710 may be displayed according to rankings in the area 910 below the first comments.

As described above, when the second comment displayed in the area 910 no longer corresponds to a latest comment according to the elapse of time, the second comment may be excluded from selecting of the second comment and may no longer be displayed in the area 910.

Also, even when the second comment displayed in the area 910 does not meet the second condition according to feedback from the users, the corresponding second comment may be excluded from selecting of the second comment and may no longer be displayed in the area 910.

Also, when the second comment displayed in the area 910 meets the first condition according to feedback from the users (e.g., when the second comment corresponds to top 15, for example, among all the comments, the corresponding comment may be selected as the first comment and a display position may move to the area 720. The moved comment may be displayed at an appropriate position in the area 720 according to a ranking.

Also, when the second comment displayed in the area 910 corresponds to the highest-ranked second comment according to feedback from users, a display position of the corresponding comment may move to the uppermost area 710. Even though the first comment displayed in the area 720 corresponds to the highest-ranked second comment according to feedback from users as a latest comment, the display position of the corresponding comment may move to the uppermost area 710.

When the first comment displayed in the area 720 no longer meets the first condition according to feedback from the users, the corresponding first comment may be excluded from selecting of the first comment and may no longer displayed in the area 720. Description related to technical features made above with reference to FIGS. 1 to 7 may apply to FIGS. 8 and 9 and thus, further description is omitted.

In the aforementioned example embodiment, "content" that is a target on which a comment is to be written may be webtoon content or one episode of the webtoon content. Here, the content may convert from paid content of which viewing by the user terminal 50 is paid to free content after a predetermined (or, alternatively, desired) period of time elapses. For example, the content may be content that is paid content as the latest episode of the webtoon content and converts to free content after the predetermined (or, alternatively, desired) period of time (e.g., two weeks) elapses.

As described in the example embodiment, the plurality of comments written for the content may include at least one comment written when the content is in a paid content status and at least one comment written when the content is in a free content status.

In the case of the paid content, it may be possible to write a comment on content only by the user terminal 50 (i.e., a user account) having paid for viewing of content. A predetermined (or, alternatively, desired) period of time needs to pass for the paid content to convert to the free content. Here, for content that converts from the paid content to the free content after the predetermined (or, alternatively, desired) period of time, there may be an issue with the best comments being biased in favor of comments written when the content is in a paid content status (i.e., comments written by paid user).

Also, once a best comment is selected, the best comment may not be changed with another best comment. That is, there may be an issue with the first determined best comment being fixed as is.

In an example embodiment, it is possible to prevent a best comment from being biased and fixed by additionally selecting a best comment (a second comment) to which freshness is applied.

Therefore, even for content that converts from paid content to free content after a predetermined (or, alternatively, desired) period of time, it is possible to provide a best comment that accurately reflects real-time public opinion of users on the content.

The apparatuses described herein may be implemented using hardware components, software components, and/or a combination thereof. For example, an apparatus and a component described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to be performed through various computer methods. Here, the media may continuously store a computer-executable program or may be temporarily store the same for execution or download. Also, the media may be various recording devices or storage devices in which single piece of hardware or a plurality of hardware is combined and may be distributed over a network without being limited to media directly connected to a computer system. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A comment management method performed by a computer system configured to manage a plurality of comments written for content, the comment management method comprising:

selecting at least one first comment from among the plurality of comments based on a first condition that is based on feedback from users for each of the plurality of comments;

selecting at least one second comment from among the plurality of comments based on a second condition that is based on a time at which a comment is written for the content and the feedback from the users; and distinguishably displaying the first comment and the second comment on a user terminal that displays the content, wherein the content is webcomic content or one episode of the webcomic content, the content converts from paid content, of which viewing by the user terminal is paid, to free content after a desired period of time elapses, and the plurality of comments includes at least one content written when the content is the paid content and at least one content written when the content is the free content.

2. The comment management method of claim 1, wherein the feedback includes a preference indication or a non-preference indication from the users for each of the plurality of comments, the first condition includes selecting N first comments with a relatively higher preference of the users from among the plurality of comments, the N detonating a natural number, and the second condition includes selecting K second comments with a relatively higher preference of the users from among latest comments written within a desired duration of time from a current point in time among the plurality of comments, the K denoting a natural number.

3. The comment management method of claim 2, wherein each of the selected first comment and second comment satisfies at least one of a first requirement that a number of preference indications be greater than or equal to a first number and a second requirement that the number of preference indications be greater than or equal to a number of non-preference indications multiplied by the predetermined multiplier.

4. The comment management method of claim 2, wherein the first condition includes selecting, from among the plurality of comments, a comment of which a number of preference indications is greater than or equal to a first number and of which the number of preference indications is greater than or equal to a number of non-preference indications multiplied by a predetermined multiplier as the first comment, and the second condition includes selecting, from among the latest comments, a comment of which the number of preference indications is greater than or equal to the first number and of which the number of preference indications is greater than or equal to a number of non-preference indications multiplied by the predetermined multiplier as the second comment.

5. The comment management method of claim 2, wherein the current point in time is a point in time at which the first comment and the second comment are displayed on the user terminal that views the content, and the desired duration of time is 24 hours.

6. The comment management method of claim 1, wherein the selecting of the at least one first comment includes selecting a plurality of first comments, and the selecting of the second comment includes selecting a plurality of second comments, and the comment management method further comprises:

ranking the first comments;

ranking the second comments, and the distinguishably displaying of the first comment and the second comment includes distinguishably displaying the ranked first comments and the ranked second comments such that a higher-ranked comment is displayed above a lower-ranked comment.

7. The comment management method of claim 6, wherein the ranking of the first comments includes ranking the first comments in descending order of a number of preference indications received from the users for each of the first comments, and the ranking of the second comments includes ranking the second comments in descending order of a number of preference indications from the users for each of the second comments.

8. The comment management method of claim 6, wherein the ranking of the first comments includes ranking the first comments in descending order of a ratio of a number of preference indications to a number of non-preference indications from the users for each of the first comments, and the ranking of the second comments includes ranking the second comments in a descending order of a ratio of a number of preference indications to a number of non-preference indications from the users for each of the second comments.

9. The comment management method of claim 6, wherein the distinguishably displaying of the ranked first comment and the ranked second comments:

displaying at least a portion of the ranked first comments and the ranked second comments in a first area of a screen of the user terminal; and displaying at least a portion of the plurality of comments or at least a portion of remaining comments excluding the portion of the ranked first comments and the portion of the ranked second comments from among the plurality of comments in a second area of the screen of the user terminal different form the first area.

10. The comment management method of claim 9, wherein the displaying of the portion of the ranked first comments and the ranked second comments in the first area includes displaying a highest-ranked second comment among the second comments at a top of the first area, displaying the ranked first comments according to the ranking of the first comments below the highest-ranked second comment, and displaying remaining ranked second comments excluding the highest-ranked second comment from among the second comments below the ranked first comments.

11. The comment management method of claim 10, further comprising:

monitoring whether the first condition or the second condition is met for each of the plurality of comments and reselecting at least one of the ranked first comments and the ranked second comments to be displayed in the first area from among the plurality of comments; and adjusting a display position of at least one of the ranked first comments and the ranked second comments in the first area based on the reselection.

12. The comment management method of claim 11, wherein the reselecting of the portion of the ranked first comments and the ranked second comments includes selecting, from among the plurality of comments, a comment that meets all of the first condition and the second condition as the first comment.

13. The comment management method of claim 11, wherein the reselecting of the portion of the ranked first comments and the ranked second comments includes, when a comment that meets all of the first condition and the second condition is the highest-ranked second comment among the second comments, selecting the comment that meets all of the first condition and the second condition as the second comment, and the highest-ranked second comment is displayed at the top of the first area.

14. The comment management method of claim 2, wherein the selecting of the second comment includes, when a writing time of a comment preselected as the second comment is outside the desired duration of time from the current point in time, excluding the preselected comment from the second comment.

15. The comment management method of claim 2, further comprising:

when a comment preselected as the second comment meets the first condition, excluding the preselected comment from the second comment and selecting the excluded preselected comment as the first comment.

16. The comment management method of claim 1, wherein the plurality of comments includes a comment written for another comment, and at least one of the first comment and the second comment includes the comment written for the another comment.

17. A computer system for managing a plurality of comments written for content, comprising:

at least one processor configured to execute computer-readable instructions recorded in a memory, wherein the at least one processor is configured to, select at least one first comment from among the plurality of comments based on a first condition that is based on feedback from users for each of the plurality of comments, select at least one second comment from among the plurality of comments based on a second condition that is based on a time at which a comment is written for the content and the feedback from the users, and distinguishably display the first comment and the second comment on a user terminal that displays the content, wherein the content is webcomic content or one episode of the webcomic content, the content converts from paid content, of which viewing
by the user terminal is paid, to free content after a
desired period of time elapses, and the plurality of comments includes at least one content
written when the content is the paid content and at least
one content written when the content is the free content.

18. A user terminal comprising:

at least one processor configured to execute computer-
readable instructions recorded in a memory, wherein the at least one processor is configured to, display a plurality of comments written for content
through a screen of the user terminal, and distinguishably display a first comment selected from
among the plurality of comments based on a first
condition that is based on feedback from users for each
of the plurality of comments and a second comment
selected from among the plurality of comments based
on a second condition that is based on a time at which
a comment is written for the content and the feedback
from the users, wherein the content is webcomic content or one episode
of the webcomic content, the content converts from paid content, of which viewing
by the user terminal is paid, to free content after a
desired period of time elapses, and the plurality of comments includes at least one content
written when the content is the paid content and at least
one content written when the content is the free content.

\* \* \* \* \*